United States Patent
Bartok et al.

(10) Patent No.: US 9,942,037 B2
(45) Date of Patent: *Apr. 10, 2018

(54) SYSTEM FOR MANAGING CRYPTOGRAPHIC KEYS AND TRUST RELATIONSHIPS IN A SECURE SHELL (SSH) ENVIRONMENT

(71) Applicant: Venafi, Inc., Salt Lake City, UT (US)

(72) Inventors: Peter D. Bartok, Sandy, UT (US); Paul A. Turner, Salt Lake City, UT (US); Joseph D. Skehan, Sandy, UT (US); Jason W. K. Brothers, Lehi, UT (US)

(73) Assignee: VENAFI, INC., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/173,987

(22) Filed: Jun. 6, 2016

(65) Prior Publication Data
US 2017/0244563 A1  Aug. 24, 2017

Related U.S. Application Data

(63) Continuation of application No. 14/131,635, filed as application No. PCT/US2012/045758 on Jul. 6, 2012, now Pat. No. 9,363,080.
(Continued)

(51) Int. Cl.
*H04L 9/32* (2006.01)
*H04L 9/14* (2006.01)
(Continued)

(52) U.S. Cl.
CPC .............. *H04L 9/14* (2013.01); *H04L 9/0891* (2013.01); *H04L 9/30* (2013.01); *H04L 63/06* (2013.01);
(Continued)

(58) Field of Classification Search
None
See application file for complete search history.

(56) References Cited

U.S. PATENT DOCUMENTS

| | | |
|---|---|---|
| 2003/0126464 A1 | 7/2003 | McDaniel et al. |
| 2006/0200494 A1 | 9/2006 | Sparks |

(Continued)

FOREIGN PATENT DOCUMENTS

WO  WO-2013009621 A1  1/2013

OTHER PUBLICATIONS

"U.S. Appl. No. 14/131,635, Response to Pre-Interview First Office Action filed Oct. 8, 2015", 3 pgs.
(Continued)

*Primary Examiner* — Brandon S Hoffman
(74) *Attorney, Agent, or Firm* — Schwegman Lundberg & Woessner, P.A.

(57) ABSTRACT

A system for managing cryptographic keys and trust relationships in a secure shell (SSH) environment by mapping network servers, clients, and appliances and locating SSH keys and key pairs associated with each device. The system provides for mapping the network topology and all SSH keys and key pairs stored on network connected devices, and the creation of a master database of all devices, keys and key pairs, key types and encryption strength, and user accounts with which each key or key pair is associated. The mapping and database enable the effective management of SSH keys and key pairs, detection of errors and weakness, elimination of orphaned or outdated keys, correction of all deficiencies, and replacement of keys in accordance with policies set by the organization maintaining the network.

19 Claims, 14 Drawing Sheets

Related U.S. Application Data

(60) Provisional application No. 61/505,972, filed on Jul. 8, 2011.

(51) Int. Cl.
*H04L 9/30* (2006.01)
*H04L 29/06* (2006.01)
*H04L 9/08* (2006.01)

(52) U.S. Cl.
CPC .......... *H04L 63/126* (2013.01); *H04L 63/168* (2013.01); *H04L 63/20* (2013.01); *H04L 2209/24* (2013.01)

(56) References Cited

U.S. PATENT DOCUMENTS

| | | |
|---|---|---|
| 2006/0248082 A1 | 11/2006 | Raikar et al. |
| 2007/0083665 A1 | 4/2007 | Miao |
| 2014/0317409 A1 | 10/2014 | Bartok et al. |

OTHER PUBLICATIONS

"U.S. Appl. No. 14/131,635, Notice of Allowance dated Feb. 4, 2016", 5 pgs.

"U.S. Appl. No. 14/131,635, Pre-Interview First Office Action dated Sep. 17, 2015", 4 pgs.

"U.S. Appl. No. 14/131,635, Response filed Oct. 27, 2015", 17 pgs.

"International Application Serial No. PCT/US2012/045758, International Preliminary Report on Patentability dated Aug. 16, 2013", 8 pgs.

"International Application Serial No. PCT/US2012/045758, International Search Report dated Sep. 24, 2012", 2 pgs.

"International Application Serial No. PCT/US2012/045758, Written Opinion dated Sep. 24, 2012", 13 pgs.

U.S. Appl. No. 61/505,972, filed Jul. 8, 2011, Method for Managing a Secure Shell Enviornment.

U.S. Appl. No. 14/131,635, filed Jul. 7, 2014, System for Managing Cryptographic Keys and Trust Relationships in a Secure Shell (SSH) Enviornment.

| client IP ↙1020 | clientAcct ↙1030 | Server IP ↙1040 | SrvAcct ↙1050 | command ↙1060 |
|---|---|---|---|---|
| 161.127.147.63 | root | 161.127.147.61 | root | cp file1 |
| 161.127.147.63 | dp | 161.127.147.61 | kevin | cd /etc |
| 161.127.147.63 | dp | 161.127.147.61 | dp | ./cleanup |
| 161.127.147.74 | administrator | 161.127.147.61 | kevin | rm old |
| 161.127.147.61 | root | 161.127.147.63 | root | mkdir 1 |
| 161.127.147.61 | art | 161.127.147.63 | dp | mv f1 f2 |
| 161.127.147.61 | brett | 161.127.147.63 | dp | lprint f1 |
| 161.127.147.61 | kevin | 161.127.147.63 | dp | ./launch |
| 161.127.147.61 | dp | 161.127.147.61 | dp | ./demolish |
| 161.127.147.74 | administrator | 161.127.147.248 | dp | cp f1 f2 |
| 161.127.147.74 | administrator | 161.127.147.248 | dave | |

SYSTEM FOR MANAGING CRYPTOGRAPHIC KEYS AND TRUST RELATIONSHIPS IN A SECURE SHELL (SSH) ENVIRONMENT

CROSS-REFERENCE TO RELATED APPLICATION

This application is a continuation of U.S. patent application Ser. No. 14/131,635, filed Jul. 7, 2014, now U.S. Pat. No. 9,363,080 issued on Jun. 7, 2016, which application is a U.S. National Stage Application under 35 U.S.C. 371 from International Application No. PCT/US2012/045758, filed Jul. 6, 2012, which application claims the benefit of priority based on U.S. Provisional Patent Application Ser. No. 61/505,972 filed Jul. 8, 2011 and titled "Method for Managing a Secure Shell Environment," the disclosures of which are incorporated herein by reference.

FIELD OF INVENTION

The invention relates to the management of Secure Shell (SSH)—as well as SFTP, SCP and other related protocols—keys and trust relationships, a critical part of computer security used by corporations and governments, as used on Unix, Linux, and similar operating systems on both server and client computers, and on computer appliances including routers, switches, and firewalls.

BACKGROUND

SSH is a protocol that leverages public key cryptography to authenticate and secure access among computers in a computer network. SSH secures Telnet-related operations. Telnet has traditionally been used for remote management of Unix, Linux, and Unix-like computers, routers, switches, firewalls, and other appliances and systems. It has also been used for automated connections between systems via scripting and batch processing. SSH Devices include SSH clients, SSH servers, and SSH-enabled computing appliances, entities, or virtual machines acting as SSH clients or SSH servers. Separate user accounts may also act as SSH Devices.

However, Telnet does not provide for the authentication of systems or the encryption of connections (for example, usernames and passwords are passed across a Telnet connection in clear text and can be intercepted by someone listening on the network). SSH secures Telnet connections by authenticating servers to which a user or system are connecting (ensuring they are not providing their username and password to the wrong system), encrypting the connection to the server (so that usernames and passwords are not intercepted), and optionally authenticating the client using public key cryptography as an alternative to usernames and passwords. File transfer protocol (FTP) has commonly been used along with Telnet to facilitate and is subject to the same security challenges. Consequently, protocols such as Secure FTP (SFTP) and Secure Copy (SCP) have been developed to be used alongside SSH and generally use the same public and private keys (Key Pairs) used for SSH for their security. References within this document to SSH also refer to SFTP and SCP.

In the SSH protocol, there is a client (the system or user that initiates the connection) and a server (the system to which a connection is requested and made). In the simplest configuration, a Key Pair is generated for an SSH server. The public key is used by one or more SSH clients to authenticate the SSH server. The SSH clients store the public key after the first connection with the SSH server, creating a trusted relationship known in which the stored key is known as a Known Host Key. Optionally, a Key Pair can be generated for an SSH client to authenticate the client to SSH servers using public key cryptography instead of usernames and passwords. The SSH servers to which the SSH client connects may store its public key, creating a trusted relationship in which the stored key is known as an Authorized Key.

Because administrators who manage the systems that act as SSH servers and clients can individually generate Key Pairs and distribute or store the public keys used for authentication, these Key Pairs and public keys have proliferated broadly in organizations. This phenomenon has effectively created untracked trusted relationships and access between systems (and users).

SSH is used in large network environments where thousands or tens of thousands of users, computers, and connected devices rely on it for secure authentication for mission critical applications. The resulting number of public and private keys used for authentication grows geometrically with the expansion of the network environment. Moreover, computing networks are not static. Users and devices are added, removed, change on a regular basis; authentication rights of users and devices are also modified regularly to correlate with organizational changes. Security policies of the organization maintaining the network environment may also be altered. Thus, the management of public-private key pairs in an SSH environment (SSH Key Pairs) is critical to establishing and maintaining security within the organization's network environment There are five primary challenges that have emerged through the use and proliferation of SSH under the current state of the art. They include:

(1) No Inventory of SSH Key Pairs: Because administrators of a network computing environment are able to easily create and deploy SSH Key Pairs themselves, most organizations do not have a central inventory of them. They are consequently not able to monitor entitlements, whether proper key lengths are being used, whether weak-key formats remain in use (e.g. RSA1), or whether Key Pairs are regularly replaced, as is considered essential for a secure system. This creates a major security risk because SSH is the most commonly used method for root-level login to mission critical systems.

(2) Unaccounted for Known Host and Authorized Keys: Public keys stored and used by clients to authenticate servers (Known Host Keys) or by servers to authenticate clients (Authorized Keys) must be tracked because they represent explicit trust between and access to systems. If the wrong Known Host Key or Authorized Key is in place, an SSH system may unintentionally establish a connection with the wrong system or user, thus enabling a security breach. Most organizations have no inventory of their Known Host Keys or Authorized Keys. Consequently, mission critical servers may be trusting Public Keys assigned to systems or users that should not have been or should no longer be trusted. A prime example is the inadvertent continued validity of keys for individuals who have been re-assigned within, or terminated by, the organization maintaining the network environment.

(3) No Key Replacement: Best practices for secure management of authentication credentials dictate that cryptographic keys should be changed regularly to reduce the likelihood that an unauthorized person has gained access to a key and is able to intercept confidential communications or impersonate a person or system and perform unauthorized operations or gain unauthorized data access. Most organizations rarely, if ever, replace their SSH Key Pairs, even though system administrators with access to those Key Pairs may have been reassigned or terminated. Due to the mission critical nature of the systems where SSH is used, this creates a significant risk that an unauthorized user or system can access sensitive information or systems.

(4) Failed Key Replacement: In order to replace a Key Pair, all of its corresponding Known Host Keys or Authorized Keys must also be replaced prior to the replacement of the Key Pair. If a Key Pair is being used for automated batch operations (a very common practice) and all locations of the corresponding Authorized Keys and Known Host Keys are not properly updated when the Key Pair is replaced, it is likely that a mission critical system or process will fail because the new Key Pair will not be trusted. This is a likely scenario because organizations don't have accurate inventories of SSH Key Pairs and corresponding Authorized and Known Host Keys.

(5) Use of Weak Encryption Keys: The US National Institute of Standards (NIST) has recommended that organizations cease using cryptographic key pairs that are less than 2048-bits (256 bytes) in length due to the increased risk of factoring or brute-force attacks possible with smaller keys sizes. Many organizations continue using 1024-bit, 768-bit, and even 512-bit keys in their SSH environments because administrators are unaware of the risks rarely update Key Pairs, because tools to manage these vulnerabilities are not readily available, or because of the risk of a failed key replacement due to an incomplete inventory. This opens organizations to potential security breaches due to via a key factoring or brute force attack.

Thus, there is a clear need for an integrated system capable of addressing the shortcomings of the current practices prevalent for this important security mechanism. The system described provides such an integrated method and tool set, meeting the long-felt need for effective management of SSH Keys.

SUMMARY

The system described in one embodiment of the invention addresses the weaknesses of the current art using a unified, iterative approach as required by the nature of the SSH protocol and the network environments in which it is deployed. The system provides for the discovery and identification of existing SSH Devices; collection of information about existing SSH Key Pairs and Known Host or Authorized Keys on those devices; mapping SSH trust relationships using that data; detection of vulnerabilities, out of policy conditions, and other; and correction of those issues.

In order to address the management and security issues that arise in SSH environments, it is necessary to identify all, or at least the majority, of systems that use SSH so that information can be collected from them and analyzed. The system provides for an iterative process of identifying SSH Devices which are not already known. Because systems acting as SSH servers listen and respond on network ports, the system provides for performing a network scan to identify SSH Servers deployed on a network. Automated scanning of even the largest networks may be implemented and the resulting inventory of systems acting as SSH servers stored in a central store, which may be a secure store with controlled access.

Next, the system provides for the collection and analysis of SSH-related information from each of the known SSH Devices, including any systems acting as SSH Servers identified using the network scan. The information can be collected from these systems using an agent, by remotely connecting to the system, via removable media, or by some other means. The agent is a software program that may run on an as-needed basis, or installed for continuous operation as a daemon or service.

The collected information includes SSH Server Key Pairs, SSH Client Key Pairs, Known Host Keys (SSH server public keys stored by clients in order to authenticate those servers) and corresponding network addresses, Authorized Keys (SSH client public keys stored by servers in order to authenticate those clients) and corresponding accounts, and connection logs. The collected information is analyzed in the following way to identify any SSH systems that exist on the network that have not yet been identified:

Orphan Known Host Keys: Any collected Known Host Keys for which a corresponding SSH Server Key Pair has not been collected are identified. The network address associated with each orphan Known Host Key is used to locate the SSH Device where the corresponding SSH Server Key Pair is located so that system can be added to the list of known SSH Devices and information can be collected from it.

Orphan Authorized Keys: Any collected Authorized Keys for which a corresponding SSH Client Key Pair has not been collected are identified. The account associated with each orphan Known Host Key is used to locate the SSH Device where the corresponding SSH Client Key Pair is located by analyzing the connection logs or by some other means. Once the SSH Device is identified, it is added to the list of known SSH Devices and information can be collected from it.

Unaccounted for SSH Clients: SSH Clients that authenticate using password-based authentication will not have an Authorized Key on a server but can be identified using the connection logs. Any not previously accounted for SSH Clients that are found in the connection logs are added to the list of known SSH Devices so that information can be collected from them.

Once an SSH Device has been identified, the system provides for the collection and analysis of SSH Server Key Pairs, SSH Client Key Pairs, Known Host Keys, and Authorized Keys to enable mapping of SSH Server and Client Trust Relationships. SSH Server Trust Relationships are identified by correlating the SSH Client and Associated Accounts that hold Known Host Keys that match each SSH Server Key Pair and the SSH Server(s) on which it resides. SSH Client Trust Relationships are identified by correlating each SSH Client Key Pair and the SSH Client and Associated Accounts where it resides with the Authorized Keys and SSH Servers and Associated Accounts where they reside.

The system also provides for the collection of other SSH-related information that may affects security in the network environment-such as login restrictions, key lengths, and authentication requirements-so that such information can be evaluated for compliance with appropriate security practices and with policies established for the network environment.

Based on predetermined policies of the organization and predetermined choices for remedial action, the system can provide reports and then allow automated or, where appropriate, manual update of SSH Key Pairs and SSH Public Keys that must be changed in order to maintain the level of security set by policy. The nature of the SSH methodology itself dictates that such remedial action must be taken in a specific sequence. This is accomplished by first replacing Public Keys of the systems where the new SSH Key Pairs must be trusted; and, second, by replacing the Key Pairs on the SSH Servers or SSH Clients where they belong.

Using this approach, the system enables the discovery and remediation of SSH Key-based security on systems of arbitrary size. Systems that have not been properly managed for a protracted period of time may be scanned, analyzed, and corrected in one integrated operation. The discovery of issues in need of remediation also assists an organization in setting or amending appropriate policies for preservation of proper security going forward. Thereafter, the system provides for convenient, regular maintenance of the policies established by the organization.

BRIEF DESCRIPTION OF DRAWINGS

FIG. 10 depicts key location mapping with additional Options shown for each discovered relationship;

DETAILED DESCRIPTION

The SSH protocol uses public-key cryptography to authenticate communication among any number or combination of computers, computing appliances, and users and secure that communication via encryption. This protocol facilitates secure authentication and communication over a secure channel across a network that is not necessarily secure overall.

SSH plays an important part in the infrastructure of corporations and government organizations. SSH is used to secure Telnet communications-much like SSL secures web-based HTTP communications. SSH secures Telnet communications essentially by fully replacing that protocol. Telnet and SSH are used for remote administration, scripting, batch processing, and file transfer on a variety of computer systems, such as Unix, Linux, and Unix-like operating systems, Cisco routers, and on a wide variety of computing appliances, including switches, routers, and firewalls, any of which may function as SSH Devices.

Figure 1:
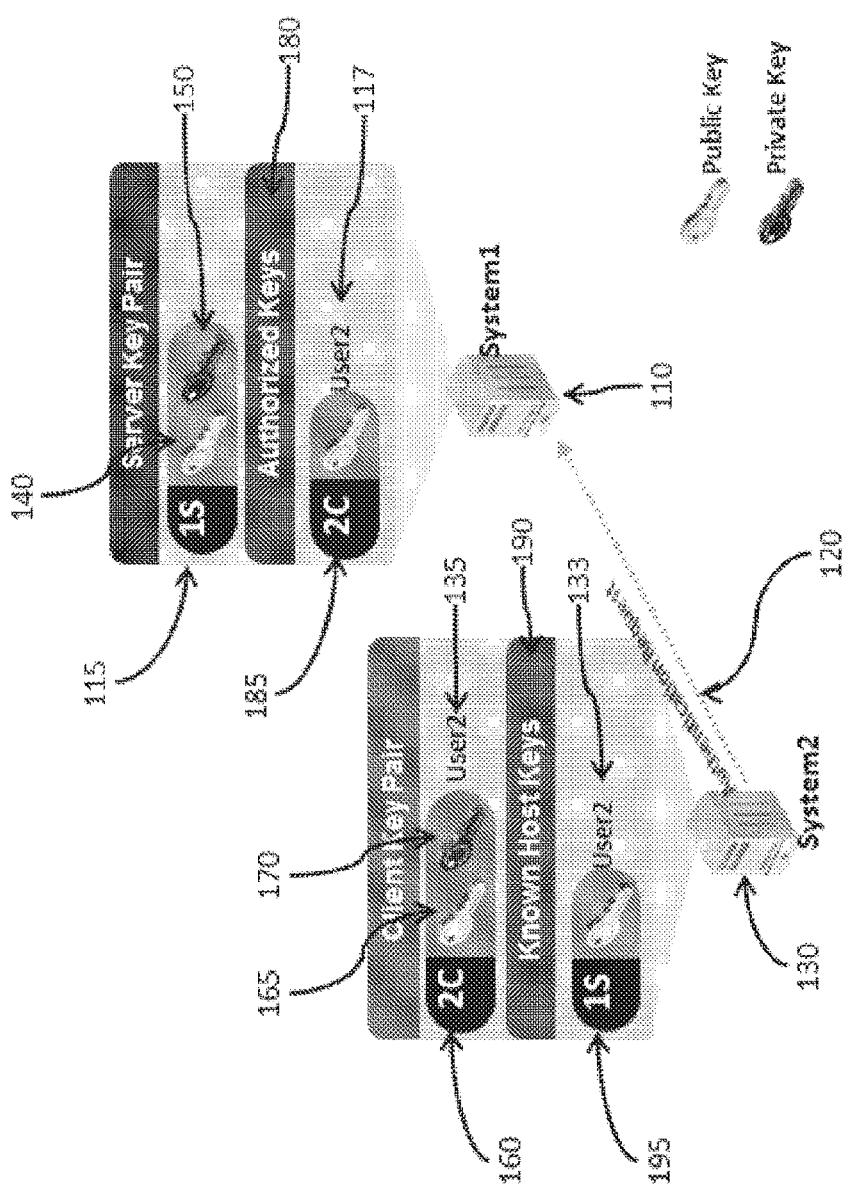
FIG. 1 depicts the storage of keys on server and client computers or devices in an SSH environment.

A computer network using SSH for authentication and security includes at least one SSH Server and at least one SSH Client. FIG. 1 depicts such a minimal configuration shown diagrammatically. In the Figures, Public Keys are depicted as dark and Private Keys as light images of a physical key. SSH Keys associated with those systems are identified by the number associated with the system followed by an uppercase "S" for servers and an uppercase "C" for clients. Thus, the SSH Server Key Pair 115 is identified as 1S, indicating that it is an SSH Server Key Pair associated with System1.

There are two actors in an SSH session: an SSH Client 130 and an SSH Server 110. The SSH Client is the system that initiates a connection by sending an authentication request 120. The SSH Server 110 is the system to which the SSH Client 130 initiates the connection. The SSH Client 130 can represent a person (such as a user performing administrative tasks) or an automated process (automatically executing remote commands, transferring files, managing flow through an appliance, etc.).

SSH uses a Public Key 140 and Private Key 150 (SSH Server Key Pair 115) to authenticate the SSH Server 110, which then allows the negotiation of a session key and establishment of a secure, encrypted session 120. This enables secure communications so that data, usernames, passwords, commands, and other information can be transferred between the SSH Server 110 and SSH Client 130 without being discernible by a party who has access to the network. Most implementations of the SSH protocol use the Diffie-Hellman key exchange which effectively prevents interception of keys and information, avoiding most vulnerabilities associated with a "man-in-the-middle" attack on security.

When SSH keys are used to authenticate the SSH Server 110, an SSH Server Key Pair 115 is generated and installed on the SSH Server 110. When an SSH Client 130 connects to an SSH Server 110, the SSH Server 110 will send its Public Key 140 to the SSH Client 130. If the owner of the SSH Client 130 chooses to "trust" the Public Key 140, it will be stored locally by the SSH Client 130 as a Known Host Key 195, along with the address of the SSH Server 110 for future connections to that SSH Server 110, creating an SSH Server Trust Relationship. Because there can be multiple user accounts on an SSH Client, the Known Host Key is stored with a particular account 133 on the SSH Client 130 that initiated the connection to the SSH Server 110, hereby referred to as Associated Account. Each SSH Client 130 that connects to one or more SSH Servers 110 performs this same storing of Known Host Keys 195.

Each time an SSH Client 130 connects to an SSH Server 110, it will compare the Public Key 140 provided by the SSH Server 110 with locally stored Known Host Key 195. If the keys match, the SSH Client 130 will continue with the SSH session 120 creation process. If they do not match, the SSH Client 130 should stop the SSH session 120 creation process and display an error for the user of the SSH Client 130.

After the SSH Client has successfully compared the provided Public Key 140 with the Known Host Key 195, the SSH Client 130 confirms through cryptographic means that the SSH Server 110 holds the Private Key 150 corresponding to that Public Key 140, and then securely negotiates a session key through cryptographic means. The session negotiated through the SSH verification may use any number of other cryptographic algorithms to ensure the privacy of communications for that session. For example, a Triple DES symmetric encryption key could be exchanged and used for this purpose. Once the secure connection has been established, the person or program using the Associated Account 133 can authenticate using a username and password and transfer information to and from the SSH Server 110 securely.

As an alternative to the client or user providing a password for authentication, the SSH Public and Private Keys themselves can also be used to authenticate SSH Clients—known as SSH public key authentication. In this scenario, an administrator or user 135 (User2) of the SSH Client 130 will generate an SSH Key Pair (SSH Client Key Pair 160) for a particular account 135 (Associated Account) on the SSH Client 130 and provide the Public Key 165 to the SSH Server 110.

An administrator or user of the SSH Server 110 will store the Public Key 165 on the SSH Server 110 and associate it with a particular user account 117 (hereby referred to as Associated Account) on the SSH Server, such key becoming an Authorized Key 185. This enables the SSH Client 130 to authenticate to that account 117 on the SSH Server 110 without necessarily providing a password, becoming in essence an automated login and creating an SSH Client Trust Relationship. SSH Servers 110 store Authorized Keys 185 for all accounts 117 that authenticate via SSH Public Key authentication.

It is possible for an SSH Device 250 to act as both an SSH Server and as an SSH Client. In these instances the SSH Device 250 in its role of SSH Server will hold an SSH Server Key Pair 253, the Public Key of which will be stored as a Known Host Key 238 on an SSH Client 230 with an Associated Account 237. That SSH Server 250 may store one or more Authorized Key 252 with an Associated Account 251 which corresponds to SSH Client Key Pair 232 on an SSH Client 230 with an Associated Account 231. The SSH Device 250 in its role as SSH Client will have an SSH Client Key Pair 256 stored with an Associated Account 255, the Public Key of which may be stored on an SSH Server 210 as an Authorized Key 222 with an Associated Account 218. The SSH Client 250 may store a Known Host Key 266 with an Associated Account 265 that corresponds to the SSH Server Key Pair 214 for an SSH Server 210.

Figure 3:
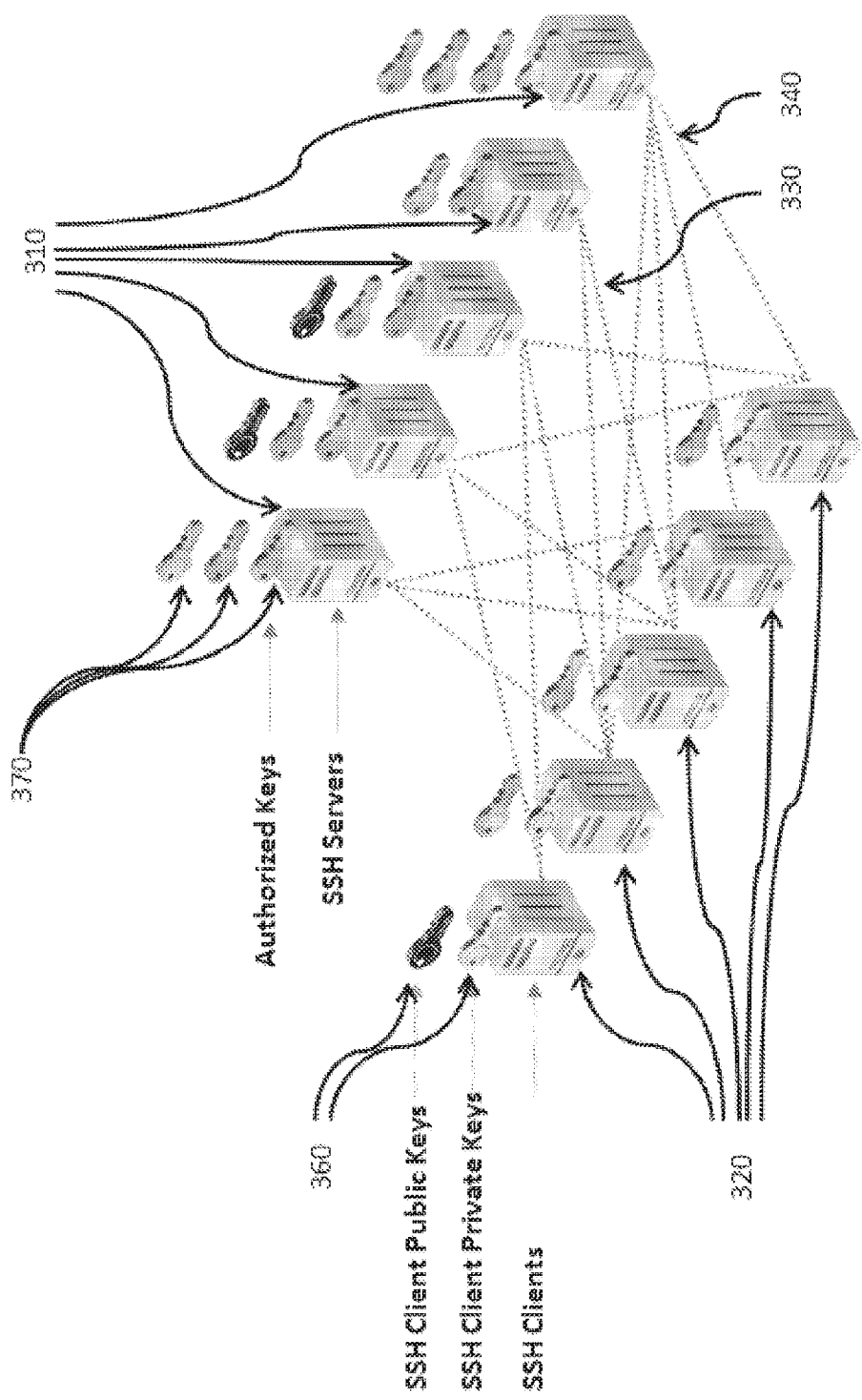
FIG. 3 depicts the proliferation of connections and associated keys in a network environment.

While this cryptographic method is effective in ensuring authentication of sessions among clients and servers, including both human users and computing appliances, the management of the system presents significant challenges. New SSH Key Pairs can be created by system administrators or users on the systems for which they are responsible and SSH Public Keys can be installed as Known Host Keys (on SSH Clients) or Authorized Keys (on SSH Servers) on those same systems. In most organizations, this results in a proliferation of Public keys on SSH Clients and SSH Servers throughout organization, and a concomitant inability to track the location of these keys. FIG. 3 illustrates the existence of SSH Client Key Pairs 360 on SSH Clients 320 and the proliferation of Authorized Keys 370 on SSH Server 310 to create a large number of SSH Client Trust Relationships 340 that are difficult to track.

The network environment for even a small business typically includes multiple servers and client devices and any number of designated users of such devices. A large enterprise or government network may include thousands or even tens of thousands of server and client devices that depend on the SSH protocol for secure authentication and for data communication via a secure session. Moreover, a single computer or device may function as both an SSH Server and as an SSH Client. Multiple user accounts may function as independent SSH Clients.

Over time, the proliferation of keys, along with changes in users and devices, often results in invalid SSH Server and Client Trust Relationships due to personnel changes or changes in system architecture. Organizations are not able to accurately review the trust relationships and resulting entitlements. Consequently, users who are reassigned or even terminated may still have access to mission critical systems and data because their Authorized Keys are not removed and they retain copies of their Client Public Keys. This lack of visibility and management leaves organizations vulnerable to unknown devices, outdated keys, weak encryption associated with keys (e.g. short key lengths and algorithms that have proven breakable), and changes in personnel and user accounts; creating a serious security risk for the organization maintaining the network.

While not every device connects to every other device, calculation of the number of potential connections is similar to that used in computing the number of diagonals in a polygon based on the number of vertices, the formula for which is $n(n-3)/2$ where n represents the number of vertices. In a real world application, the number of users and devices may easily run into the hundreds, thousands, or even tens of thousands in a large organization, in which case the number of possible connections quickly becomes unmanageable using current technology and defies any attempt at manual remediation.

FIG. 3 depicts the geometric progression in the number of possible connections as the number of devices increases. In the example, five SSH Servers 310 and five SSH Clients 320 are shown a typical configuration. The identification of servers, clients, switches, and other devices represented by the servers and clients will also be associated with IP addresses or other addressing systems and with certain ports that may be associated with different functions and communications protocols. Reference to the identity of devices within a network environment, as addressed by the system, includes identification methods typical of network configurations, such as IP addresses, MAC addresses, DNS addresses, and ports, as applicable and as known in the art.

As noted, not every server necessarily communicates with every client. In the illustrated example, the number of connections from a server to multiple clients range from two of the five clients 330 to four of the five clients 340. In each case, the number of Authorized Public Keys for each SSH Server is depicted by the key icons shown above each server 550. At the same time, each of the SSH Clients 320 has a unique Client Key Pair 360. Because the number of servers and clients can increase arbitrarily and the authorized connections may vary for each server or client, the complexity of the requirements for managing secure connections increases rapidly as n network environments expand. Moreover, the number and topology of authorized connections does not remain static, because SSH Servers and SSH Clients may be added, removed, or repurposed. In addition, changes in the identity and number of users of the various devices are generally even more frequent than changes in the devices themselves.

Figure 4:
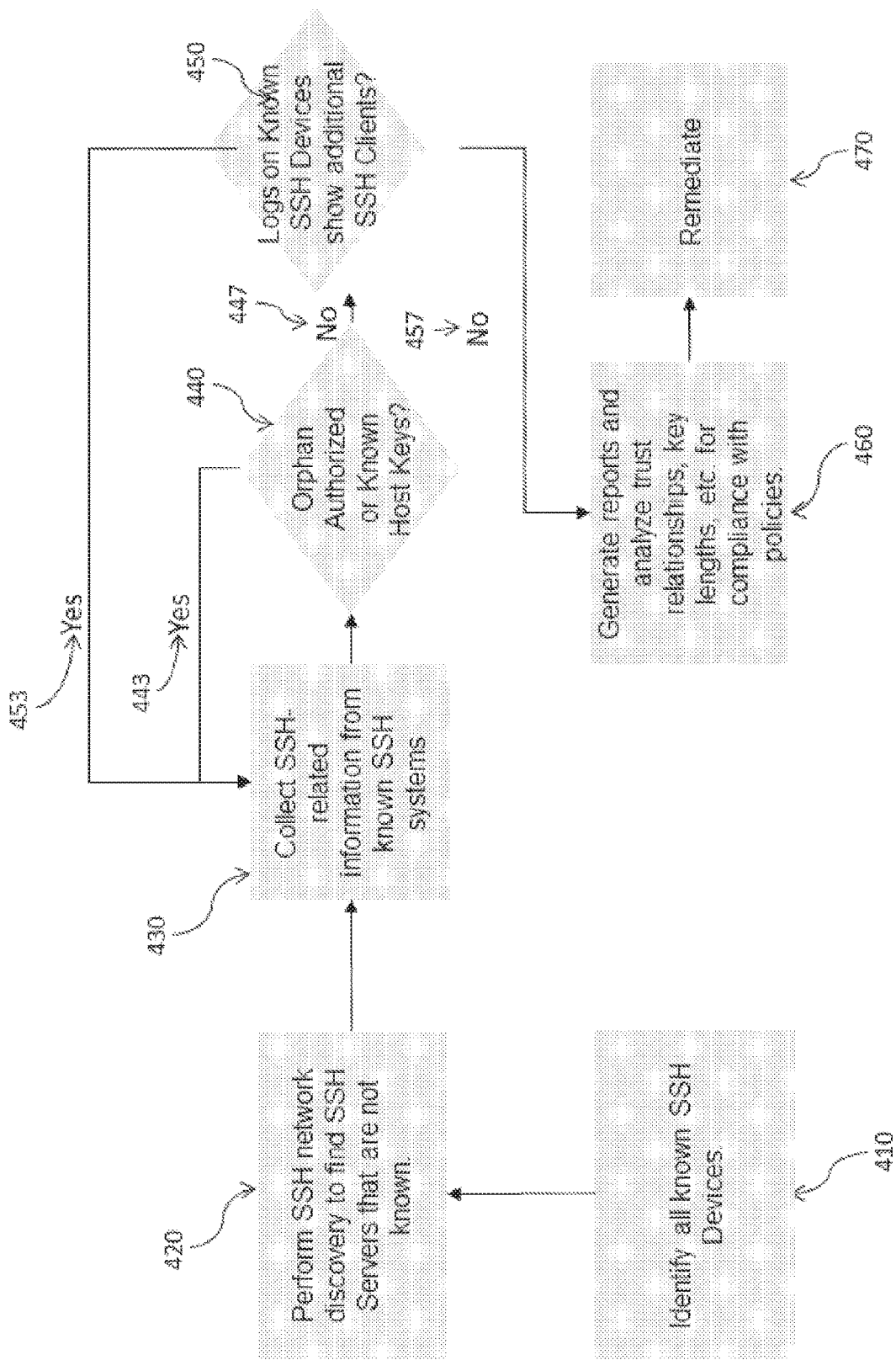
FIG. 4 depicts a flow chart for identifying SSH systems for the purpose of correcting security vulnerabilities.

FIG. 4 depicts a flow chart of the method used to identify SSH Devices acting SSH Servers, SSH Clients, or both in a network environment for the purpose of detecting and correcting security vulnerabilities. The first step is to account for all currently known SSH Devices 410. This can be accomplished by contacting groups or individuals likely to be responsible for SSH Devices, for example. However, because it is critical to ensure that this information is complete, a network scan is consequently undertaken to discover additional SSH Servers 420. This process continues until the required identification and location information for all SSH Servers has been discovered.

When all discoverable SSH Servers have been found and accounted for in the list of known SSH Devices, the system collects SSH-related information form the known SSH systems, including SSH Server Key Paris, SSH Client Key Pairs, Known Host Keys, Authorized Keys, and connection logs 430. The collected information is analyzed to identify any Authorized Keys for which there is no corresponding SSH Client Key Pair (Orphan Authorized Keys) and any Known Host Keys for which there is no corresponding SSH Server Key Pair (Orphan Known Host Keys) 440.

These orphan keys indicate that there are SSH Clients (indicated by the existence of Orphan Authorized Keys) and SSH Servers (indicated by the existence of Orphan Known Host Keys) that are not accounted for. The location of these unaccounted for SSH Clients and SSH Servers is determined through processing of information in the connection logs from other sources within the organization managing the network environment, such as administrators with domain knowledge). The information in the connection logs is also processed to identify any SSH Clients that may be authenticating with usernames and passwords 450. SSH-related information is iteratively collected and analyzed for SSH Clients and SSH Servers identified in steps 440 and 450.

When Orphan Keys are found or additional SSH Devices discovered from examination of logs, further discovery of Key Pairs, Authorized Public Keys and Known Host Keys 460 from those SSH Devices is indicated. In one embodiment of the system, this is accomplished by placing software agents on those SSH Devices, which agents may be run as one-time programs or installed for repetitive operation as daemons or as processes. This process is repeated iteratively 465 until no additional undiscovered information has been found. At this point, the system concludes that all SSH Servers, SSH Clients, and corresponding Key Pairs have been discovered 470. The information from the scanning and discovery process is centrally stored. In one embodiment of the system, the central store comprises a relational database which facilitates searching, sorting, and analysis of the stored information.

The central store of information is then used to generate reports, analyze trust relationships and to verify that policies of the organization maintaining the network environment are in compliance 480. For example, weak keys, expired user identities, and other information that reveals vulnerabilities can be readily discovered. Remedial action may then be taken 490, either by automated means or manually, to eliminate vulnerabilities and bring the network environment into compliance with policy.

The network scan 410 identifies SSH Servers (including all devices functioning as servers) in the environment and collects predetermined categories of information about those SSH Servers. The network scan is performed by implementing the system on a predetermined host computer and setting up connections among the host and other devices in the computing environment to be scanned using addresses and ports and establishing an SSH connection. In one embodiment of the system, the information collected during the scanning process includes the following, which is centrally stored in a master database:

Major and minor version of the SSH implementation residing on each server
    SSH protocol versions supported by each server
    SSH Server Public Key(s) associated with each server
    Key length of SSH Server Public Key
    Format of SSH Server Public Key (e.g. RSA1)
    Cryptographic algorithm used with SSH Server Public Key (e.g. RSA, DSA)
    SSH protocol versions supported by the SSH Server
    Whether password-based SSH authentication is enabled
    Whether public key-based SSH authentication is enabled
    Whether interactive keyboard authentication is enabled.

Figure 2:
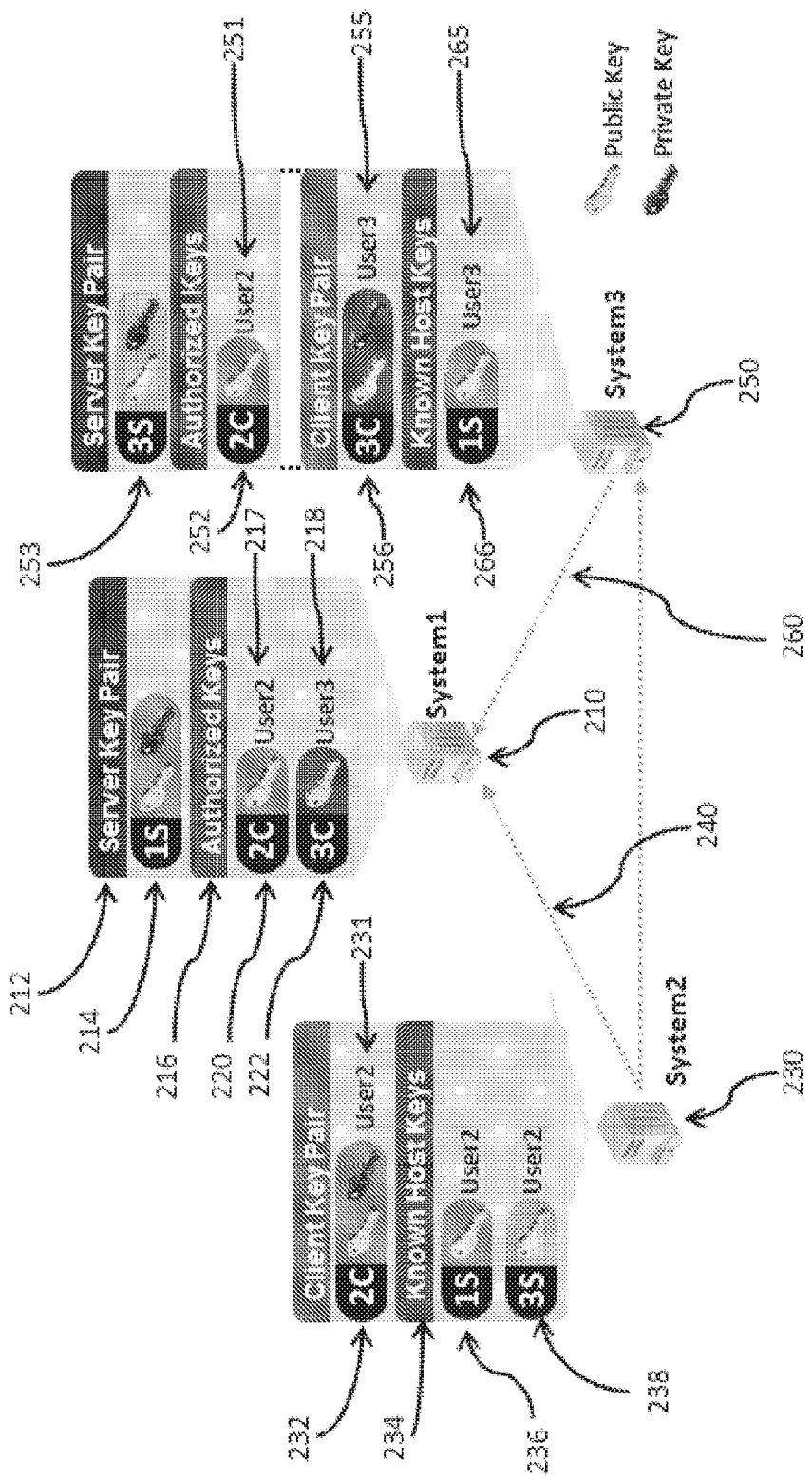
FIG. 2 depicts the connections that exist in a network comprised of multiple servers and clients.
Figure 5:
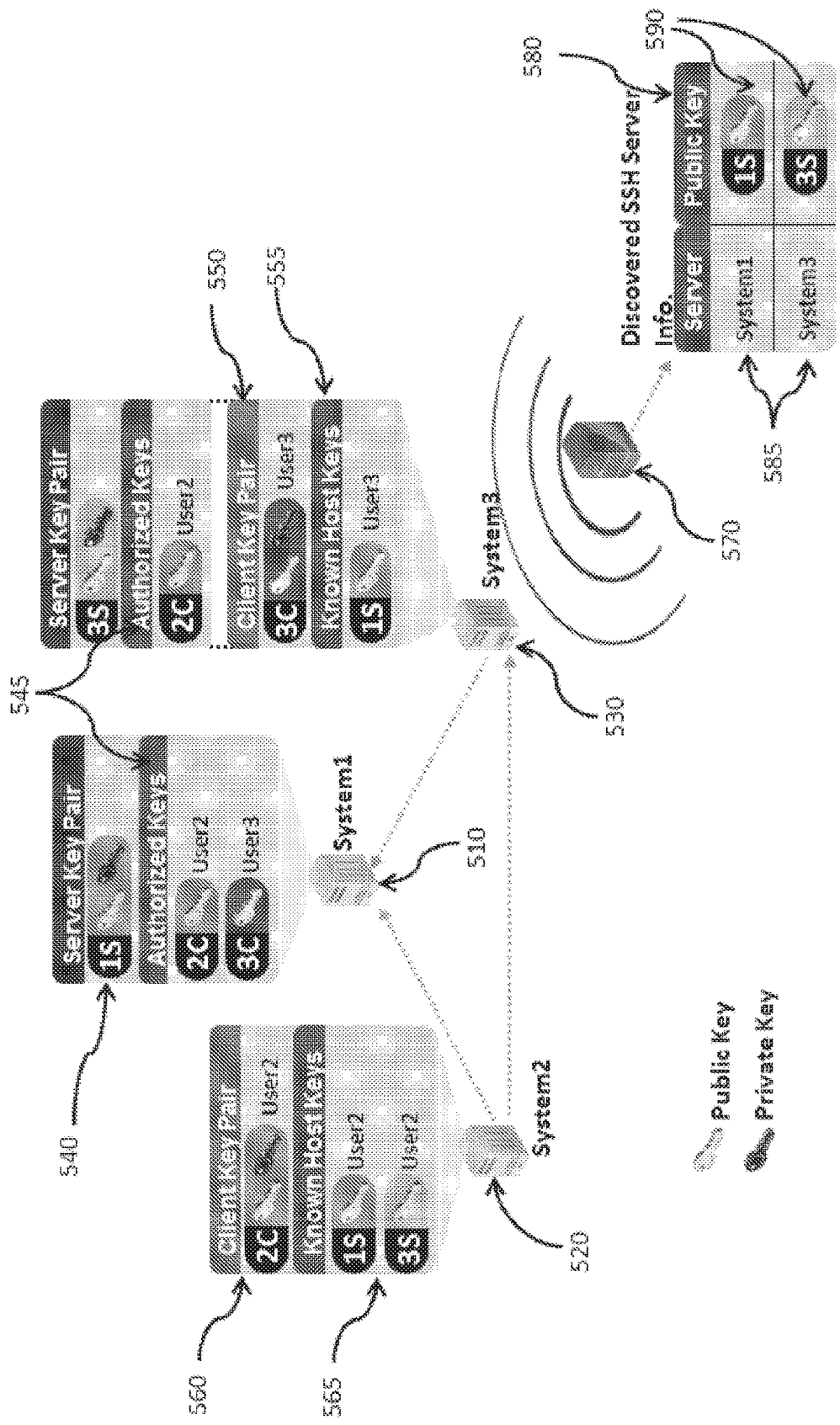
FIG. 5 depicts the process of network discovery in the sample network environment.

FIG. 5 illustrates this scanning process in the example environment illustrated in FIG. 2. In the example, System1 510 is identified as an SSH Server and System2 520 as an SSH Client. System3 530 functions as both an SSH Server and an SSH Client. Each system identified as an SSH Server has an associated Server Key Pair 540 and a set of one or more Authorized Keys 545 used by SSH Clients to authenticate to those servers. In the case of System3, which functions as both server and client, the system maintains a separate SSH Client identity including a Client Key Pair 550 and a set of one or more Known Host Keys 555 associated with SSH Servers to which it authenticates as an SSH Client.

SSH Client System2 also maintains a distinct Client Key Pair 560 and a set of Known Host Keys 565 for SSH Servers to which it authenticates. The host computer 570, on which the system is implemented, first discovers and identifies the servers and generates a server table 580 that includes the identity of each server 585 and the identity and the type of key found 590. In the example, two SSH Servers have been discovered, identified as System1 and System3 and Server Public Keys 1S and 3S stored for subsequent reference.

The primary function of the scan is to identify SSH Devices information should be collected to continue the process of discovery of additional SSH enabled devices and users, as shown in the flow chart in FIG. 4, and to collect information about each device and user. Each time that SSH Servers in the environment have been identified, information is collected from the identified servers either remotely or, if necessary or desired, manually. In one embodiment of the system, collection of information and further discovery of SSH Devices is effected by installing agents on the identified SSH Devices. These agents are independent computer programs that may run on a one-time basis or continually as a daemon or process on the devices on which they are installed. The agent software programs perform onboard, local scans of each system discovered during any prior phases of the scan to discover additional information, including:

All SSH Server Private and Public Keys (SSH Server Key Pairs) associated with each SSH Server.
    SSH Server configuration data including, by way of example:
        the location of the configuration file;
        whether RHosts (remote hosts—a software utility that allows users to log in on another host via a network using the TCP protocol) is enabled on the server;
        whether Ignore-User-Known-Hosts security is enabled on the server;
        whether Empty Passwords are allowed on the server,
        whether Public Key Login is allowed on the server;
        whether Password Login is allowed on the server;
        whether Root Login is allowed on the server; and
        whether the SSH server is active.
    All SSH Client Public Keys trusted for authentication to SSH Servers (typically referred to as Authorized Keys) and the user accounts with which each such Authorized Key is associated.
    All SSH Client Public and Private Keys (SSH Client Key Pairs), including Client Key Pairs residing on SSH Servers for the purpose of enabling an SSH Server to emulate SSH Client functions in order to authenticate to other SSH Servers. These SSH Client Key Pairs are typically associated with a specific user account. In those cases the name of the user account with which each SSH Client Key Pair is associated is also collected. The SSH Servers' Public Keys that are trusted are also collected.

Access logs documenting SSH connections between the system being scanned and other devices on the network.

Figure 6:
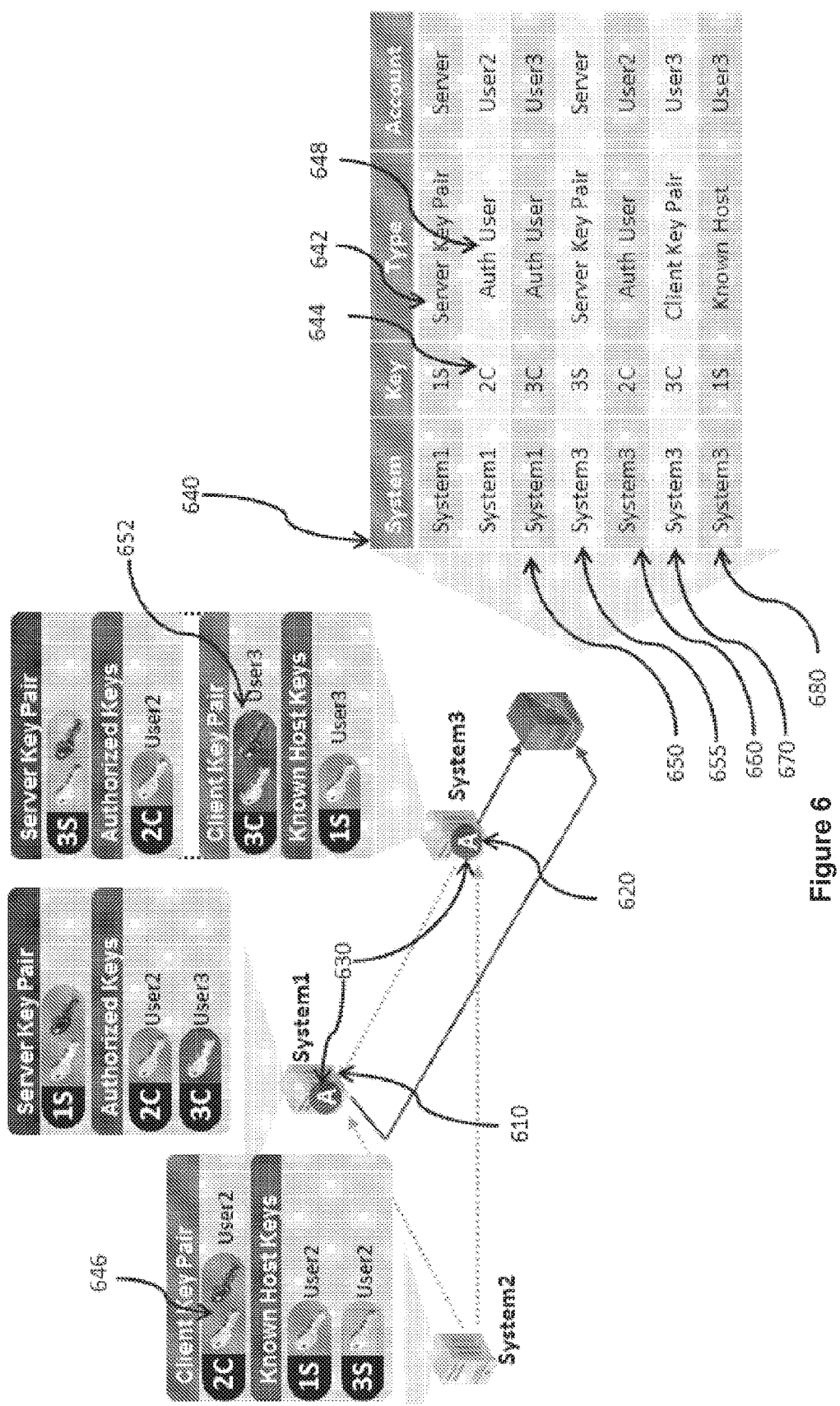
FIG. 6 depicts the installation and use of agents on SSH systems for further discovery in an SSH network environment.

FIG. 6 illustrates the process of agent discovery on SSH Servers already known or discovered during an earlier phase of the scan, and the collection of information by the agents, again using the example environment depicted in FIG. 2.

System1 610 and System3 620, having been identified as SSH Servers have agent software ("A") 630 installed on them. The agent collects SSH-related information, including information from logs that are collected in this step and, from the collected information, discovers and compiles into a table 640 the following information related to SSH keys:

The SSH Server Key Pair 1S 640 used by the SSH Server on System1.

The SSH Client Public Key (labeled 2C) 642 that corresponds to SSH Client Key Pair 2C 644 associated with an account named User2 on a yet undiscovered System2. The name of this account is collected. Since the SSH Client Public Key is used for authentication (by an unknown System2 to System1), it is identified as an Authorized Key 646 allowing establishment of SSH sessions from an unknown System2.

The SSH Client Public Key 3C 650 that corresponds to the SSH Client Key Pair 3C 652 located on User3. This Public Key is associated with an account named User3. The name of this account is collected. Since the SSH Client Public Key is used for SSH Public Key authentication (by System3 to System1), it is also identified as an Authorized Key.

On the server identified as System 3, the agent collects SSH-related information, including information from logs that are collected in this step and, from the collected information, 630 discovers the following information related to SSH keys:

The SSH Server Key Pair 3S used by the SSH Server System3 655.

The SSH Client Public Key 2C 660 that corresponds to the SSH Client Key Pair 2C 660 located on the yet undiscovered entity, System2. This Public Key is associated with an account named User2. The name of this account is collected. Since the SSH Client Public Key is used for SSH Public Key authentication (by System2 to System3), it is identified as an Authorized Key.

The SSH Client Key Pair 3C 470 used by the client account User3 on System3 to perform SSH public key authentication to System1. The name of this account is collected.

The SSH Server Public Key 1S 680 that corresponds to the SSH Server Key Pair 1S 662 on System1. This Public Key is associated with user account User3, as a Known Host Key on System3, and the name of this account is collected. In addition, the Public Key is stored along with the address of System1 and this address information is collected.

Optional information ("Options") that specify restrictions on an account, commands that should be run in association with predetermined uses of the account, any other Options required to enforce security or operational needs, such Options generally being located and discoverable in a configuration file associated with the account.

Figure 7:
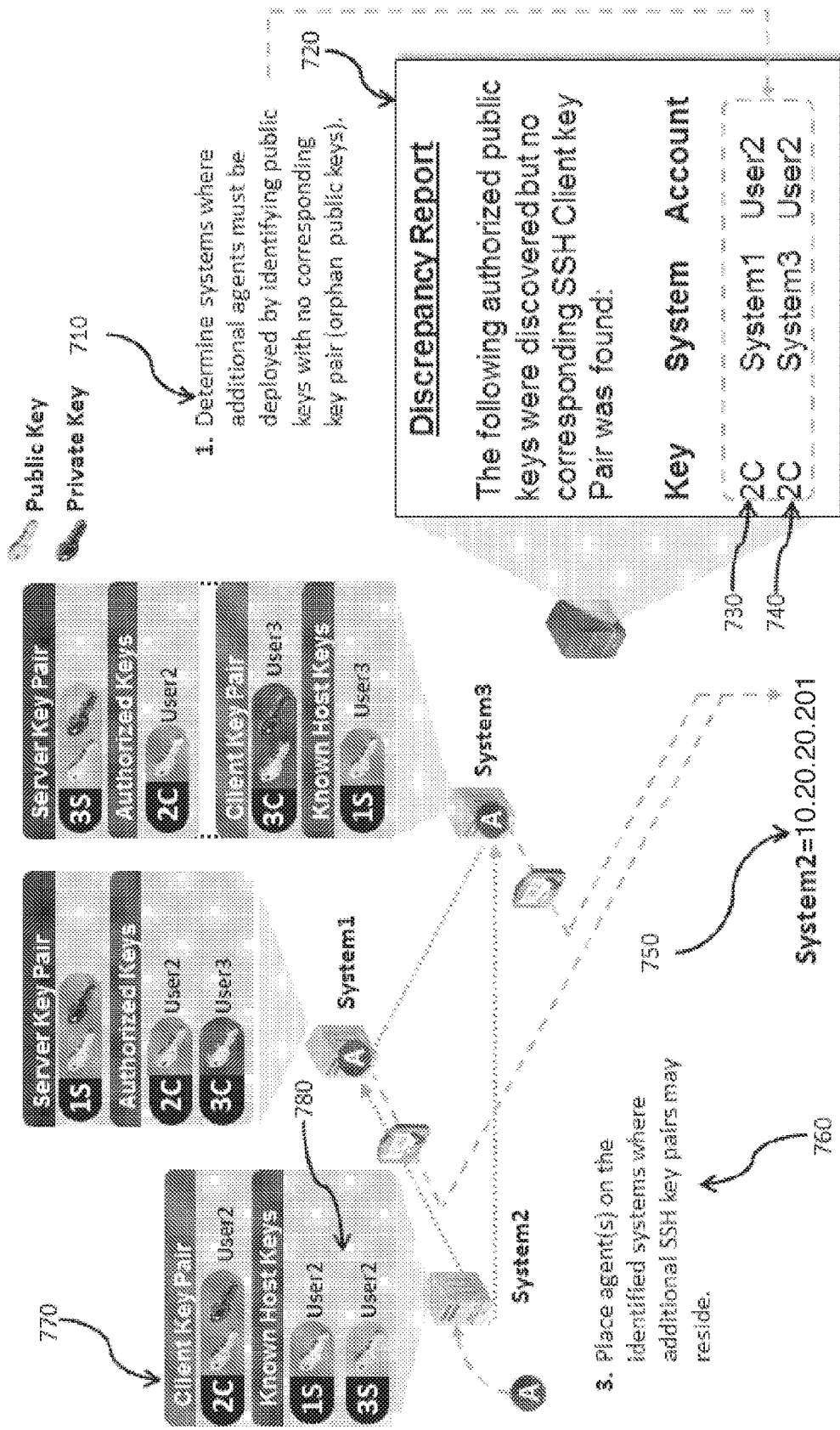
FIG. 7 depicts the process for locating additional systems to be scanned by identifying Orphan Public Keys.

FIG. 7 depicts the next step in the discovery process, in which additional systems to be scanned are located by identifying Orphan Public Keys, using as an example the same three-system configuration depicted in FIG. 6. First, it is necessary to determine where additional agents must be deployed, which is accomplished by identifying Orphan Public Keys. In this example, the information collected from SSH Servers System1 and System3, shown in table 640 enables the creation of a discrepancy report 720 which shows the presence of Authorized Key 2C for User2 on both System1 730 and System3 735.

However, there is no Client Key Pair 2C in the table associated with that Authorized Key. From the information about the Authorized Key, determined in the scan of System1 and System3, examining their respective access logs, and by using other methods known in the art, the address or location of System2 can be determined 750. In the example. System2 is located using an IP address.

An additional agent ("A") 760 is then placed and run on System2, resulting in the collection and storing of the SSH Client Key Pair for System2, and the Known Host Keys 780 on System2. As the discovery of these keys completes the set of relationships, it can be determined that no more Orphan Keys reside on System2. On the other hand, if retrieval of information from System2 and its access logs, and the use of other methods, indicates that there were other Orphan Keys, the process would be repeated, recursively, as shown in the flow diagram in FIG. 4, until no Orphan Keys or unknown entities in access logs remained.

Figure 8:
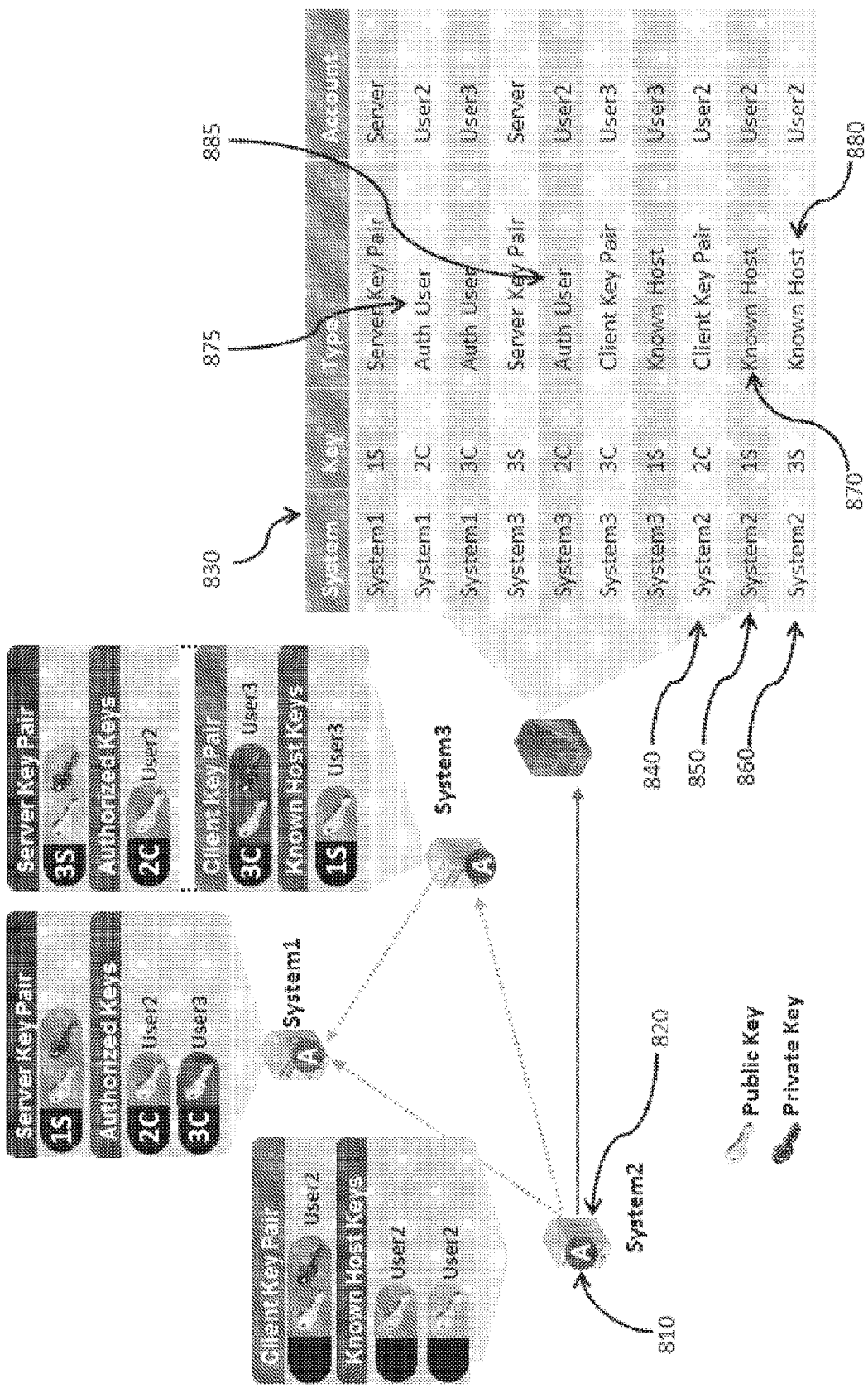
FIG. 8 depicts agent discovery on an identified SSH Client.

FIG. 8 depicts the discovery of additional information resulting from placing an agent on an identified SSH Client. As a result of the process described and shown in FIG. 7, an agent ("A") 810 has been placed on the newly discovered SSH Client identified as System2. The agent has discovered and added new information to the centrally stored table 830 of information from the network environment. Specifically, three items have been added to the table. The Client Key Pair 840 associated with System2 has been added to the table along with the nature of the key as a Client Key Pair, and the user with which it is associated (User2). A Known Host Key 1S 850 for System1 has been added, as has a Known Host Key 3S 860 for System3. Each of these keys has been associated with User2 on System2 and the two new Known Host Keys 870 and 880 correspond with the respective Authorized User found on System1 875 and on System3 885.

By this process, the Orphan Keys have now been identified and the table of client-server relationships is complete for the entities shown. Any Known Host Key without a matching Server Key Pair, or an Authorized Key without a matching Client Key Pair in the table, would be identified as Orphan Keys, indicating that further discovery is necessary, using the processes described.

Figure 9:
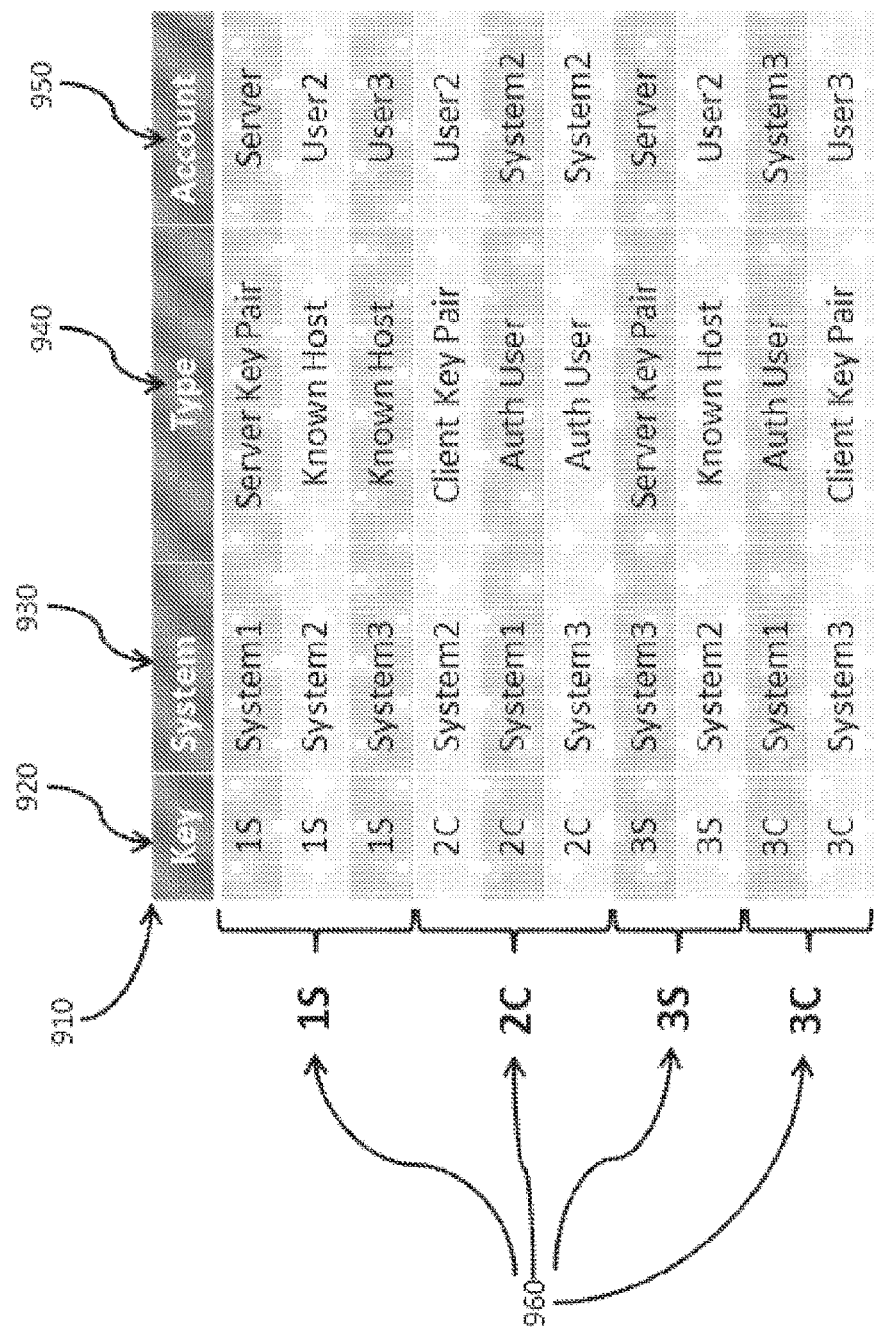
FIG. 9 depicts key location mapping resulting from the scan of an SSH environment.

FIG. 9 represents the table of information resulting from mapping the location of SSH Keys using the system. All of the collected information is stored in a central database, which may be in table format in a relational database, for processing and analysis. The table 910 includes:

identity of all SSH Keys discovered 920;

the System 930 with which they are associated;

the type 940 of Key (Server Key Pair, Client Key Pair, Authorized User, or Known Host); and the account 950 with which each key is associated Other information regarding each key, system, and account may be stored and used as required to manage the network environment and determine compliance with policy. Sorting and searching on the stored information in the table enables meaningful analysis of the information. In the example, the information in the table has been sorted according to SSH Key 960. This information is further analyzed to identify additional systems where SSH Clients reside so that agents can be installed on those SSH Clients for additional discovery.

FIG. 10 depicts a sample of additional information obtainable using the system that enables effective management of a network environment using the SSH protocol. In this instance, an Entitlement Mapping Report has been generated for us in determining the functional relationships established using the SSH protocol among systems. The table 1010, is organized to show the Client Accounts and Server Accounts that are authenticated using the SSH protocol and associated keys. For each authenticated connection, the Client IP Address 1020 and Client Account Name 1030 are shown, as are the Server IP Address 1040 and Server Account 1050 to which the SSH protocol authentication takes place.

From access logs and by other means used in managing Unix, Linux. and unix-like systems, system administrators may determine the nature and purpose of the authentication that takes place between systems using the SSH protocol. The table column 1060 labeled "Command," for example, displays the Unix command that is executed upon authentication between the Client Account and Server Account on that line of the table. These automated functions, known as forced commands in an SSH environment, reveal additional information about the authentication relationship that is valuable in managing the SSH network environment. For example a forced command may cause a database to be reset. Such a command coming from an unauthorized system could cause irreparable harm. Thus, identifying an SSH Private Key on an SSH Client that authenticates to an SSH and executes such a command, but from an unauthorized SSH Client or account, greatly aids in determining vulnerabilities and establishing severity levels and priorities for further investigation and remediation.

The reports may include full information for SSH Clients that is useful in correcting deficiencies and managing the network on an ongoing basis, including:
  The address of each SSH Client discovered;
  Every user account configured as an SSH Client on each system discovered;
  The key type and size for the SSH Client Key Pair for that account
  The location of the SSH Client Key Pair for that account;
  The corresponding user account on each SSH Server where the SSH Client Public Key is trusted for authentication, as well as that SSH Server's address;
  Options (as described above) associated with each account.

The reports also include the following information for SSH Servers for the same purposes:
  The address of each SSH Server discovered;
  Every user account discovered on each SSH Server which is configured for SSH public key authentication;
  The key size and type for the trusted SSH Client Public for the above accounts;
  The discovered SSH Clients and account(s) on those clients which are able to log into the above SSH Server accounts because they hold the SSH Client Key Pair trusted by those accounts;
  Whether password based SSH authentication, public key based authentication; and interactive keyboard authentication is enabled on each server.

Information in the central store of SSH-related information discovered by means of the system can be automatically or manually compared with predetermined policies based on a rules-based configuration of the organizations security policies, facilitating the discovery of out-of-policy conditions. Alerts and notifications may be enabled to provide information gleaned from the analysis of the network SSH conditions to the attention of specific groups or individuals. Remedial action may be initiated automatically or manually in accordance with the policies in place.

The system provides for the provisioning of SSH related information for all computers, devices, and users associated with a network. Specifically, the system includes the ability to replace or rotate SSH Key Pairs and corresponding trusted Public Keys. Validity periods may be set for SSH Key Pairs defining the period during which an SSH Key Pair is valid and after which the SSH Key Pair should be replaced. Validity periods are monitored and, prior to the end of the validity period, assigned individuals (or systems) are notified to make them aware the SSH Key Pair and corresponding trusted Public Keys should be replaced, or that they will automatically be replaced, based on the configured validity period and in accordance with policy guidelines set by the organization.

The system includes the option for one or more individuals to be required to provide approval prior to replacement. For example the replacement might not be approved because the affected systems or applications have been decommissioned and no longer need to function under the SSH protocol on the network. Individuals approving are presented with information about the systems and user accounts affected by the replacement, size of the Key Pair, and validity period.

Figure 11:
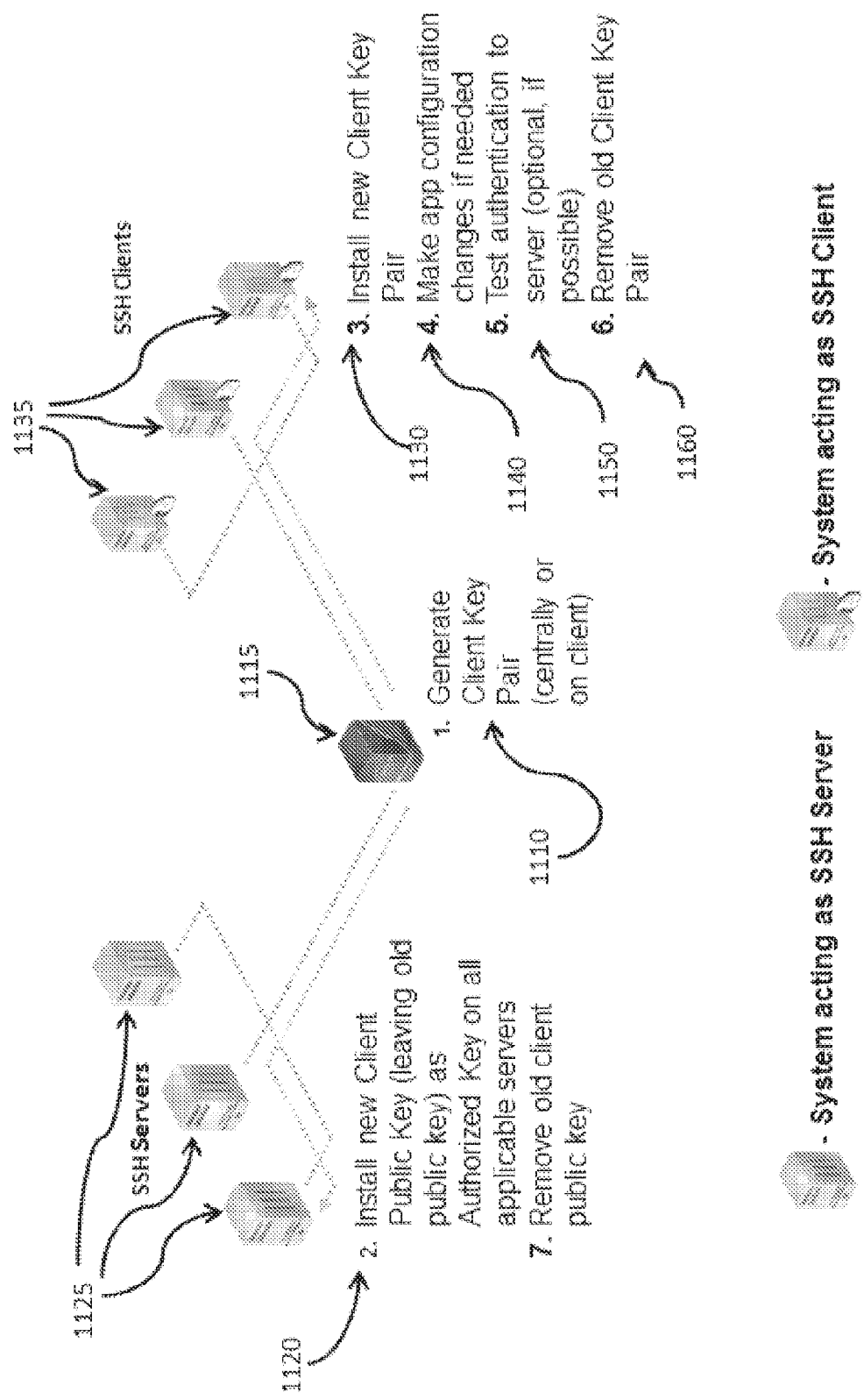
FIG. 11 depicts the process for replacing an SSH Client Key Pair and corresponding Known Host Keys and Authorized Keys.

FIG. 11 depicts the process Client Key Rollover diagrammatically. The first step is to generate a new Client Key Pair 1110. This may be done centrally, for example on the host computer on which the system is implemented or on the individual client. The Client Public Key from the newly generated Client Key Pair is then installed 1120 on the SSH Servers 1125 to which the associated Client will authenticate. The old Client Public Key remains on the SSH Server at this stage.

Next, the newly generated Client Key Pair is installed 2135 on for each SSH Client 2135. Configuration changes 2140 to applications on each SSH Client should be made if needed to reflect the rollover of the Client Key Pair. Ideally, authentication from each client to the corresponding server on which the Client Public Key was installed 1120, should be tested.

When the installation and optional testing of the new Client Key Pair has been completed, the old Client Key Pair is removed 2160. As a final step, the old Client Public Key is removed from the Server 2170. This completes the process for rolling over SSH Client Keys.

Figure 12:
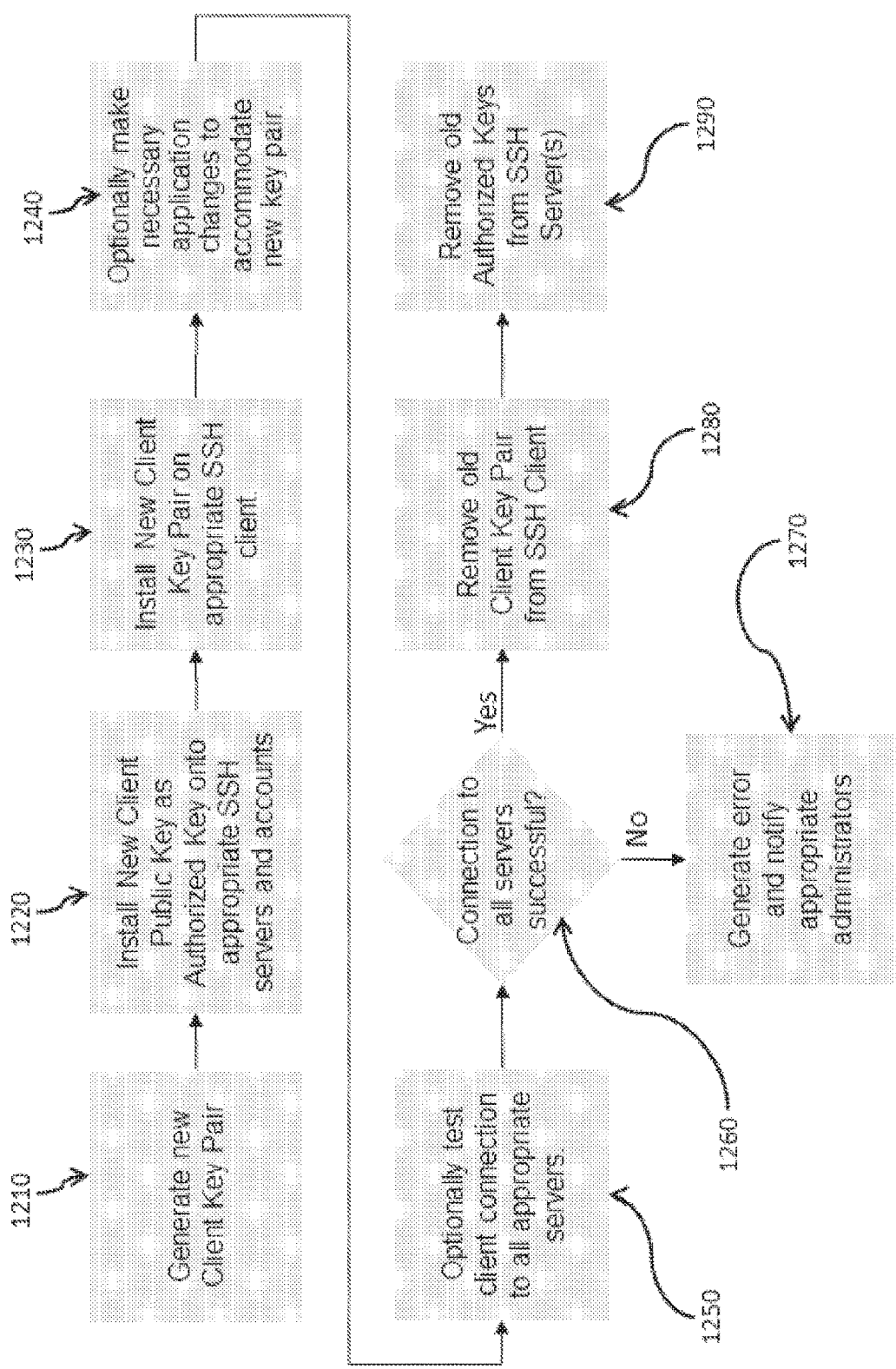
FIG. 12 depicts the process described in FIG. 11 in the form of a flow chart.

The process is further depicted in the form of a flow chart in FIG. 12 in the following steps:
  Generate new Client Key Pair 1210
  Install the new Client Public Key as an Authorized Key onto the appropriate SSH Servers and associated accounts 1220;
  Install the new Client Key Pair on the appropriate SSH Client 1230;
  Optionally, make necessary application changes to accommodate the new Client Key Pair 1240;

Optionally, test the SSH Client connection to appropriate SSH Servers 1250 to ensure that the new Client Key Pair can authenticate to the matching Client Public Key first installed on those servers in step 1220;

Determine whether connection to all appropriate SSH Servers is successful 1260 and, if not, generate an error report and notify appropriate system administrators 1270;

Remove the old Client Key Pair from the SSH Client 1280;

Remove the old Authorized Keys from SSH Servers on which they were present 1290.

Figure 13:
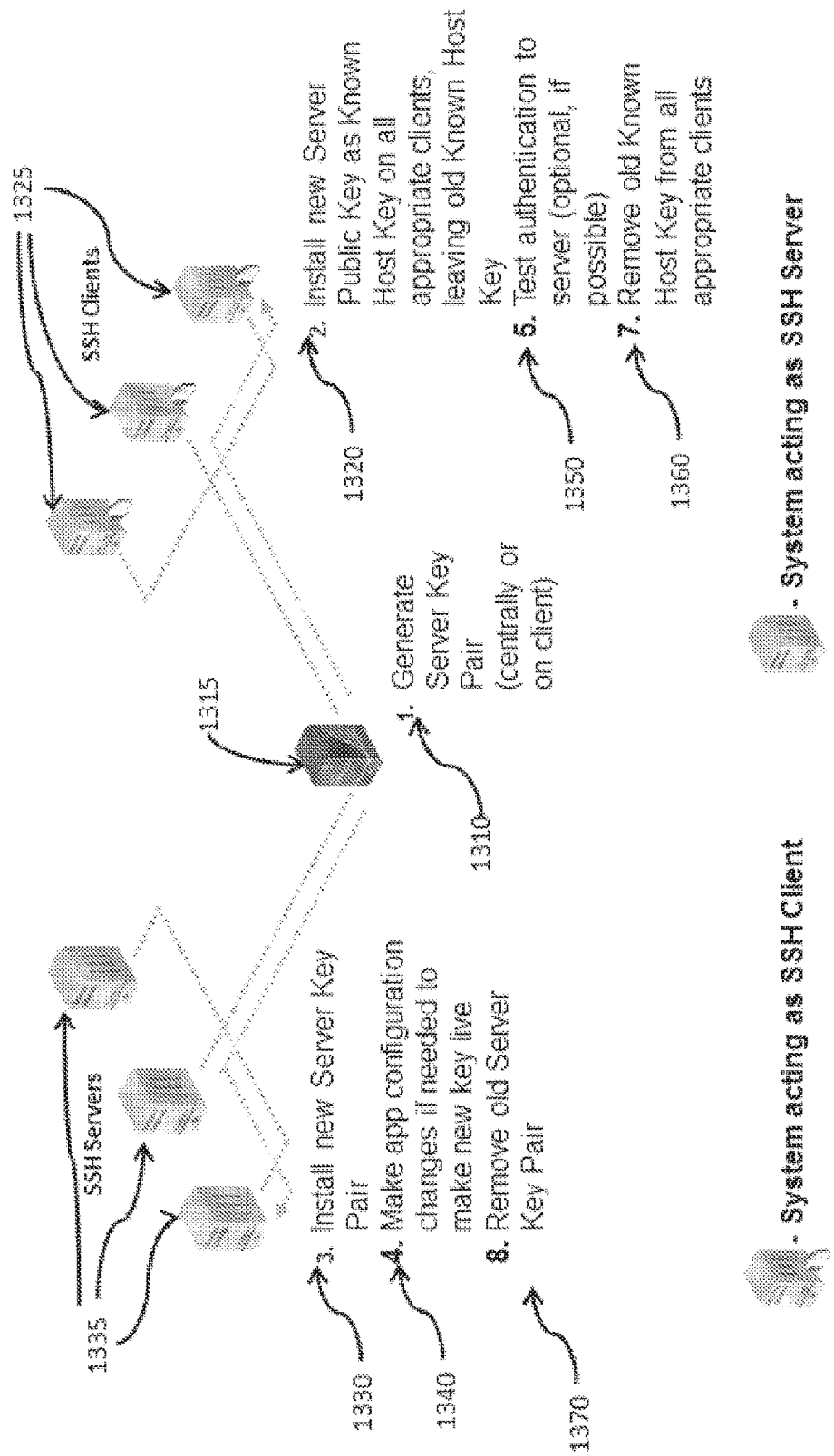
FIG. 13 depicts the process for replacing an SSH Server Key Pair replacement.

FIG. 13 depicts the process for SSH Server Key Rollover in diagrammatic form. The rollover of SSH Server keys commences with the generation of a new Server Key Pair 1310. As with the rollover of Client keys, this step may be accomplished on the individual SSH Server or centrally (for example on the host computer 1315 on which the system is implemented). Once created, the Public Key from the new Server Key Pair is installed 1320 on the appropriate SSH Clients 1325 as a Known Host Key, leaving the old Known Host Key in place.

Next, new Server Key Pairs are installed 1330 on the appropriate SSH Servers 1335. As with the SSH Clients, applications running on SSH Servers may also require configuration changes to accommodate the change to a new Server Key Pair in order to make the new Server Key Pair go "live" or function properly 1340. Once the new Server Key Pair is functional on the SSH Server, the SSH Clients 1325 should, ideally, test their ability to authenticate 1350 to the appropriate Server using their new Known Host Key and the new Server Key Pair.

Once the new Known Host Key has been installed on the SSH Client and the new Server Key Pair on the SSH Server, and any desired tests conducted, the old Known Host Key is removed from the appropriate SSH Client 1360. Finally, the old Server Key Pair is removed from the SSH Server, completing the replacement of the old Server Key Pair and associated Known Host Keys.

Figure 14:
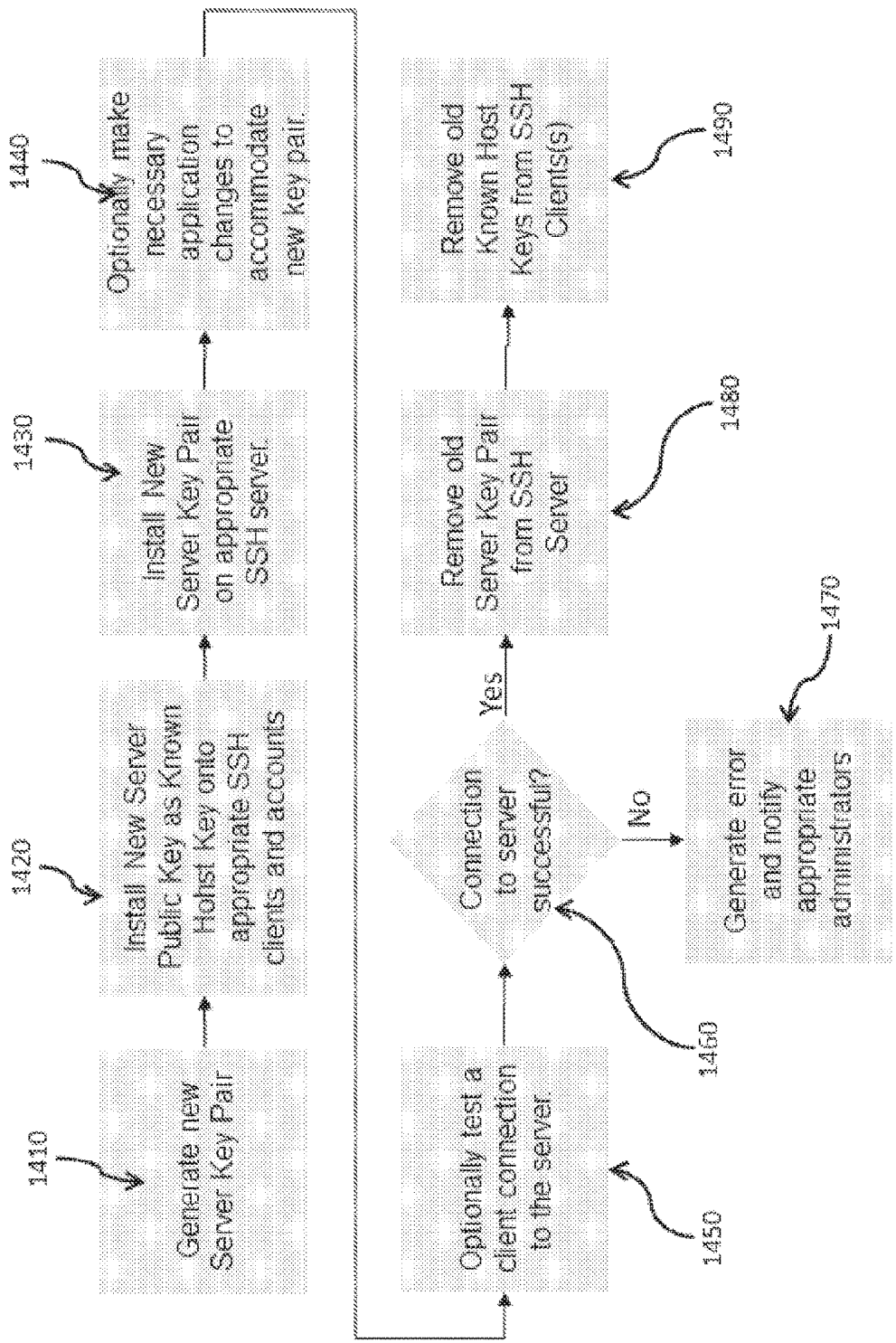
FIG. 14 depicts the process described in FIG. 13 in the form of a flow chart.

The process is further depicted in the form of a flow chart in FIG. 14 in the following steps:

Generate a new Server Key Pair 1410

Install the new Server Public Key as an Known Host Key onto the appropriate SSH Clients and associated accounts 1420;

Install the new Server Key Pair on the appropriate SSH Server 1430;

Optionally, make necessary application changes on the SSH Server to accommodate the new Server Key Pair and ensure that it is live 1240;

Optionally, test the SSH Client connection to the SSH Servers for which Server Key Pairs are being replaced 1250 to ensure that the Client can authenticate to the Server using the matching Known Host Key first installed on those Clients in step 1420;

Determine whether connection from all appropriate SSH Clients to the SSH Server receiving a new Client Key Pair is successful 1460 and, if not, generate an error report and notify appropriate system administrators 1470;

Remove the old Server Key Pair from the SSH Server 1280;

Remove the old Known Host Keys from SSH Servers on which they were present 1490.

All operations performed in the replacement process are logged and a report can be provided of all performed operations, including reviews and approvals, for any audit and operations review purposes that might be desirable.

Real world network environments that depend upon the SSH protocol for secure authentication may have upwards of 20,000 SSH Servers and numerous clients and automated devices such as switches. In such a large organization, the management for the network environment may be fragmented by legal entity, product lines, functional groups, or other sub-divisions. Managers of these sub-divisions, and particularly information technology administrators, are tasked with maintaining a secure environment by reviewing accounts, privileges, access granted, missing access requirements, etc.

These managers generally lack the information required to maintain security in the network environments for which they are responsible because of the large number of system and users, and the continuous change within their organizations. The embodiment of the system described provides for discovery, storage, and analysis of information necessary to enable managers to understand security vulnerabilities and to remediate them, restoring a secure environment and maintaining it on an ongoing basis.

Although the present system has been described in considerable detail with reference to certain embodiments, other embodiments are possible within the scope of the invention. Therefore, the spirit or scope of the appended claims should not be limited to the description of the embodiments contained herein.

The invention claimed is:

1. A system for managing cryptographic keys comprising:
   at least one processor and instructions that when executed cause the system to perform operations comprising:
   identify a list of known SSH devices connected to the system;
   for each known SSH device on the list that acts as an SSH client, connect to the known SSH device and collect:
   client key pairs;
   known host keys; and
   connection logs;
   for each known SSH device on the list that acts as an SSH server, connect to the known SSH device and collect:
   server key pairs;
   authorized keys; and
   connection logs;
   correlate the known host keys to server key pairs and identify as orphan known host keys those known host keys for which no corresponding server key pair can be located;
   correlate the authorized keys to client key pairs and identify as orphan authorized keys those authorized keys for which no corresponding client key pair can be located;
   identify unaccounted SSH devices by analyzing the connection logs.

2. The system of claim 1 wherein analyzing the connection logs comprises examining the connection logs and identifying information from which a network address associated with an unaccounted SSH device can be obtained.

3. The system of claim 1 wherein analyzing the connection logs comprises examining the connection logs and identifying connection information from at least one unaccounted SSH device.

4. The system of claim 1 wherein analyzing the connection logs comprises examining the connection logs and identifying connection information from at least one account located on an unaccounted SSH device.

5. The system of claim 1 wherein identifying unaccounted SSH devices further comprises for orphan known host keys, identify unaccounted SSH devices by identifying a network address associated with the orphan known host key.

6. The system of claim 1 wherein identifying unaccounted SSH devices further comprises for orphan authorized keys, identify unaccounted SSH devices by identifying an account associated with the orphan authorized key.

7. The system of claim 1 wherein identifying t list of known SSH devices comprises performing a network scan.

8. The system of claim 1 wherein at least a portion of the known SSH devices have a discovery agent installed.

9. The system of claim 1 further comprising:
for each unaccounted SSH device that acts as an SSH client, collecting:
client key pairs;
known host keys; and
connection logs;
for each unaccounted SSH device that acts as an SSH server, collecting:
server key pairs;
authorized keys; and
connection logs.

10. A method for managing cryptographic keys comprising:
identifying a list of known SSH devices connected to the system;
for each known SSH device on the list that acts as an SSH client, connecting to the known SSH device and collecting:
client key pairs;
known host keys; and
connection logs;
for each known SSH device on the list that acts as an SSH server, connecting to the known SSH device and collecting:
server key pairs;
authorized keys; and
connection logs;
correlating the known host keys to server key pairs and identify as orphan known host keys those known host keys for which no corresponding server key pair can be located;
correlating the authorized keys to client key pairs and identify as orphan authorized keys those authorized keys for which no corresponding client key pair can be located;
identifying unaccounted SSH devices by analyzing the connection logs.

11. The method of claim 10 wherein connecting to the known SSH devices comprises either using a discovery agent on the known SSH devices to gather information or connecting to the known SSH devices without using the discovery agent to gather information.

12. The method of claim 10 wherein analyzing the connection logs comprises examining the connection logs and identifying connection information from at least one unaccounted SSH device.

13. The method of claim 10 wherein analyzing the connection logs comprises examining the connection logs and identifying connection information from at least one account located on an unaccounted SSH device.

14. The method of claim 10 wherein identifying unaccounted SSH devices further comprises for orphan known host keys, identify unaccounted SSH devices by identifying a network address associated with the orphan known host key.

15. The method of claim 14 wherein identifying unaccounted SSH devices further comprises for orphan authorized keys, identify unaccounted SSH devices by identifying an account associated with the orphan authorized key.

16. The method of claim 10 wherein identifying the list of known SSH devices comprises performing a network scan.

17. The method of claim 10 wherein at least a portion of the known SSH devices have a discovery agent installed.

18. The method of claim 10 further comprising:
for each unaccounted SSH device that acts as an SSH client, collecting:
client key pairs;
known host keys; and
connection logs;
for each unaccounted SSH device at acts as an SSH server, collecting:
server key pairs;
authorized keys; and
connection logs.

19. The method of claim 10 wherein identifying unaccounted SSH devices further comprises for orphan authorized keys, identify unaccounted SSH devices by identifying an account associated with the orphan authorized key.

* * * * *

UNITED STATES PATENT AND TRADEMARK OFFICE
CERTIFICATE OF CORRECTION

PATENT NO. : 9,942,037 B2
APPLICATION NO. : 15/173987
DATED : April 10, 2018
INVENTOR(S) : Bartok et al.

It is certified that error appears in the above-identified patent and that said Letters Patent is hereby corrected as shown below:

On the Title Page

On page 2, in Column 2, under "Other Publications", Line 14, delete "Enviornment." and insert --Environment.-- therefor On page 2, in Column 2, under "Other Publications", Line 17, delete "Enviornment." and insert --Environment.-- therefor In the Drawings Sheet 11 of 14, Fig. 11, insert --1170--

Sheet 11 of 14, Fig. 13, reference numeral 1370, Line 1, delete "8." and insert --7.-- therefor Sheet 11 of 14, Fig. 13, reference numeral 1360, Line 1, delete "7." and insert --6.-- therefor In the Specification In Column 2, Line 32, after "environment", insert --.--

In Column 8, Line 48, delete "550." and insert --310.-- therefor

In Column 9, Line 7, delete "form" and insert --from-- therefor

In Column 10, Line 57, delete "server," and insert --server;-- therefor

In Column 11, Line 53, delete "470" and insert --670-- therefor

In Column 12, Line 21, delete "example." and insert --example,-- therefor

Signed and Sealed this
Eleventh Day of June, 2019

Andrei Iancu
*Director of the United States Patent and Trademark Office*

CERTIFICATE OF CORRECTION (continued)
U.S. Pat. No. 9,942,037 B2

In Column 12, Line 67, after "associated", insert --.--

In Column 13, Line 25, delete "Linux." and insert --Linux,-- therefor

In Column 13, Line 25, delete "unix-like" and insert --Unix-like-- therefor

In Column 13, Line 50, after "account", insert --;--

In Column 14, Line 47, delete "2135" and insert --1135-- therefor

In Column 14, Line 47, delete "2135." and insert --1135.-- therefor

In Column 14, Line 48, delete "2140" and insert --1140-- therefor

In Column 14, Line 55, delete "2160." and insert --1160.-- therefor

In Column 14, Line 56, delete "2170." and insert --1170.-- therefor

In Column 14, Line 60, after "1210", insert --;--

In Column 15, Line 43, after "1410", insert --;--

In Column 15, Line 51, delete "1240;" and insert --1440;-- therefor

In Column 15, Line 54, delete "1250" and insert --1450-- therefor

In Column 15, Line 63, delete "1280;" and insert --1480;-- therefor

In the Claims

In Column 17, Line 11, in Claim 7, delete "t" and insert --the-- therefor

In Column 18, Line 37, in Claim 18, delete "at" and insert --that-- therefor